(12) United States Patent
Levy

(10) Patent No.: US 8,514,127 B2
(45) Date of Patent: Aug. 20, 2013

(54) METHOD AND SYSTEM OF CALCULATION FOR THE EVALUATION OF THE PRECISION PERFORMANCE OF A SATELLITE NAVIGATION SYSTEM

(75) Inventor: Jean-Christophe Levy, Balma (FR)

(73) Assignee: Thales, Neuilly sur Seine (FR)

( * ) Notice: Subject to any disclaimer, the term of this patent is extended or adjusted under 35 U.S.C. 154(b) by 116 days.

(21) Appl. No.: 13/046,431

(22) Filed: Mar. 11, 2011

(65) Prior Publication Data
US 2012/0062418 A1 Mar. 15, 2012

(30) Foreign Application Priority Data

Mar. 12, 2010 (FR) ...................................... 10 00997

(51) Int. Cl.
*G01S 19/20* (2010.01)
(52) U.S. Cl.
USPC .................................................... 342/357.58
(58) Field of Classification Search
USPC .......... 342/357.45, 357.46, 357.58; 701/467, 701/468
See application file for complete search history.

(56) References Cited

U.S. PATENT DOCUMENTS

| | | | |
|---|---|---|---|
| 6,847,893 B1 | 1/2005 | Lupash | |
| 2011/0118979 A1* | 5/2011 | Mao et al. | ...................... 701/208 |
| 2011/0313614 A1* | 12/2011 | Hinnant et al. | .................. 701/33 |
| 2012/0169541 A1* | 7/2012 | Singh | ............................ 342/417 |

FOREIGN PATENT DOCUMENTS
WO 2009/112483 A1 9/2009

OTHER PUBLICATIONS

Boriana Vassileva, et al., "SBAS Vertical Protection Level Assessment in the Case of Error Reduction", John Vincent Atanasoff 2006 International Symposium on Modern Computing, Oct. 1, 2006, pp. 137-142, XP031035961.
Carl D. Milner, "Weighted RAIM for APV: An Optimised Protection Level", Proceedings of the 22nd International Technical Meeting of the Satellite Division of the Institute of Navigation, Sep. 25, 2009, pp. 1645-1651, Savannah, GA, XP002611051.
Benoit Roturier, et al., "Le Concept de SBAS Integrity Normalise Par l'OACI—Application a EGNOS", Navigation, Oct. 1, 2001, pp. 65-77, vol. 49, No. 196, Paris, FR, XP008068617.

* cited by examiner

*Primary Examiner* — Dao Phan
(74) *Attorney, Agent, or Firm* — Baker & Hostetler LLP

(57) ABSTRACT

A method and a system calculates the low probability events for the evaluation of the precision performance of a satellite navigation system, and makes it possible to certify the precision performance of a satellite navigation system for high levels of requirement by modelling events of low probability on the basis of the implementation of the theory of extreme values conjointly with the use of a chart for evaluating precision performance.

4 Claims, 1 Drawing Sheet

METHOD AND SYSTEM OF CALCULATION FOR THE EVALUATION OF THE PRECISION PERFORMANCE OF A SATELLITE NAVIGATION SYSTEM

CROSS-REFERENCE TO RELATED APPLICATION

This application claims priority to foreign French patent application No. FR 1000997, filed on Mar. 12, 2010, the disclosure of which is incorporated by reference in its entirety.

FIELD OF THE INVENTION

The invention relates to the field of satellite navigation systems and more particularly to a method of calculating the low probability events for the evaluation of the precision performance of such a system.

BACKGROUND

Currently, commercial services utilizing satellite navigation systems are expanding considerably. Products operating on the basis of radiolocation signals have become widely accessible in everyday home routine within motor vehicles for aiding road navigation initially and more recently within mobile telephone devices for a multitude of personal services. Upgrades to future satellite positioning systems, for example the GALILEO European system, promise much higher performance than current systems. Thus new services which were not able to be envisaged for lack of sufficient reliability and positioning precision are today conceivable for companies, notably road transport and air transport companies. For example, for road transport, efforts are under way to transform the economic models of the services for operating toll road sections by offering the customer personalized offers. For air transport companies, increased performance in terms of reliability and positioning precision allows the integration within aircraft of navigation devices on which pilots will be able to rely entirely. These devices will make it possible to considerably improve air transport safety. However, for services on which people's safety depends, it is mandatory to prove the reliability of the data sent by the navigation system. This is why operators of satellite navigation systems are made subject by the authorities to requirements regarding guaranteed service to the end customer.

Satellite navigation systems are characterized by performance data relating to integrity, precision and coverage. Integrity is a measure of confidence in the information provided by the satellite navigation system. A well known tool for determining the integrity of a point provided is the Stanford chart. The Stanford chart is a two-dimensional matrix whose input parameter on the horizontal axis is the observed position error vertically or horizontally and whose input parameter on the vertical axis is the protection level vertically or horizontally calculated on the basis of statistical models. This chart makes it possible to verify the proportion of measured samples whose observed position error is lower than the protection level.

The precision of a position is defined by the position error estimated with respect to the actual position. The precision of the location depends notably on the error in the estimated distance between the user and the satellites received as well as on the configuration of the geometry of the measurements. There exists a value, commonly called the DOP for "Dilution of Precision", which is indicative of the conditions of geometry of the measurements. When the value of the DOP is high, this indicates that the satellites used to obtain the position are close and therefore that the geometry is bad and when the value of the DOP is low this indicates that the satellites used to obtain the position are distant and therefore that the geometry is good.

The bodies responsible for regulations and checks relating to civil aviation require rigorous levels of performance notably as regards precision performance for critical services. Among these critical services utilizing the geo-location data of satellite navigation systems, the LPV200 service ("Localizer Performance with Vertical Guidance") required in the past that the satellite navigation system show for at least 95% of the time a location error vertically of less than 4 metres and horizontally of less than 16 metres. In the future, operators will be required to prove that the satellite navigation system proves to the user a probability of occurrence of a location error vertically of greater than 10 metres of less than $10^{-7}$ under normal conditions and a probability of occurrence of a location error of greater than 15 metres of less than $10^{-5}$ under deteriorated conditions. This service defines the alert level vertically at 35 metres and horizontally at 40 metres.

It is known that augmented satellite systems are capable of complying with the specifications demanded for events of very low probability. These verificatory checks are being performed through unwieldy and irksome methods during the development phases. According to current techniques, they would require the carrying out of measurements for which the time taken for the test would be of excessively long duration (i.e. several tens of years). Indeed, to carry out measurements of integrity margins, classical inferential statistics seeks to model the behaviour of a random variable over the observable domain of realizations. To obtain relevant statistics, it is necessary to recover data which are sufficiently uncorrelated so as not to measure redundant information. It is estimated that it is necessary to carry out samplings with a period of around 5 minutes between each measurement. However, given the low probability of the events that one seeks to detect, this would involve gathering thousands of millions of samples over thousands of years of measurements.

In the earlier patent application WO/2009/112483, the Applicant has disclosed a device providing the means for estimating an indication of integrity of a satellite navigation system making it possible to model the distribution of location errors of very low probability on the basis of extreme value theory. However, no tool for measuring precision currently exists which allows levels of requirement at low probabilities of occurrence to be certified to the user since the precision performance also depends on the satellite geometry, and the data collected do not take into account all cases of satellite geometry for each user.

SUMMARY OF THE INVENTION

The invention guarantees the precision performance of a satellite navigation system taking account of all the situations of satellite geometry for a user and to guarantee to a user a very low probability of occurrence of a location error greater than the requirements imposed on operators.

More precisely, the invention relates to a method of calculating the low probability events for the evaluation of the precision performance of a satellite navigation system comprising a space segment transmitting radiolocation signals to a receiver segment. Advantageously, it comprises the following steps:

A prior step of measuring the estimated error of location of a receiver of the system for a plurality of samples and of calculating the maximum location error threshold, called the protection radius, that can be guaranteed by the system for the said samples, the estimated error and the protection radius being defined in a dimension of a position frame of reference, A step of calculating a first proportion of a distribution of samples satisfying the following conditions:
  i. The protection radius is less than an alert threshold,
  ii. The quotient of the protection radius and of the estimated location error is greater than a safety quotient, the safety quotient being the ratio of the alert threshold to a level of requirement of estimated error.

A step of calculating a second proportion of the distribution of samples satisfying the following conditions:
  i. The protection radius is less than the alert threshold,
  ii. The quotient of the protection radius and of the estimated location error is less than the safety quotient,
  iii. The estimated location error is less than the level of requirement of estimated error.

A step of modelling at least one component of the distribution of samples, the component representing the samples of low probability of occurrence of the distribution and the modelling being calculated by applying the theory of extreme values on the basis of said observed samples of the distribution.

According to a first preferential variant, to verify the precision performance, the method comprises a step of calculating the probability of the distribution of samples for which the quotient of the protection radius and of the estimated location error is equal to the safety quotient.

According to a second preferential variant, to verify the precision performance, the method comprises a step of calculating on the one hand the probability of obtaining a sample for which the quotient of the protection radius and of the estimated location error is below the safety quotient and on the other hand, for this sample, of the probability that the protection radius is below the alert threshold in that the estimated location error is above the level of requirement of estimated error.

The invention also relates to a system for calculating events of low probability for the evaluation of the precision performance of a satellite navigation system able to implement the method according to any one of the preceding variants.

By virtue of the characteristics of the method and of the system according to the variants described above, it is possible to evaluate the probability of occurrence of the events of very low probability without having to observe them in order to verify the precision performance of a satellite navigation system.

Moreover, this method is capable of certifying a performance for all cases of satellite geometry without resorting to gigantic observation resources with the aim of observing all cases of geometry and the occurrence of events of very low recurrence.

BRIEF DESCRIPTION OF THE DRAWINGS

The invention will be better understood and other advantages will become apparent on reading the nonlimiting description which follows and by virtue of the attached figures, in which.

DETAILED DESCRIPTION

Service providers utilizing radiolocation signals of satellite navigation systems expect of these systems, on the one hand, ever higher performance and, on the other hand, service continuity and alert capabilities making it possible to warn a user of the service when the performance does not meet the expected requirements. Solutions for verifying performance currently exist for checking the integrity of a satellite navigation system whatever the conditions of observation of the signals for a user, but for the verification of precision performance, existing tools cannot guarantee it under all observation conditions since each user utilizes the radiolocation signals in a particular configuration depending on his position, on the moment of observation and on the state of the satellites seen to calculate his position.

The principle of satellite navigation systems location is briefly recalled. In a satellite navigation system, the time taken by the radiolocation signal transmitted by the satellite to reach the receiver to be located is used in order to determine the distance, called the pseudo-distance, between this satellite and this receiver, the signal containing the position data for the satellites. On the basis of the processing of the radiolocation signals transmitted by several satellites seen by a user, the latter is capable of ascertaining his position. The bigger the number of satellites and the lower the value of the DOP, the better is the precision of the position. The precision depends notably on the precision parameters of the clocks of the satellites, the atmospheric layers crossed and the precision of the corrections made.

A service of level LPV200 requires the following performance. It is required that the satellite navigation system show for at least 95% of the time a location error vertically of less than 4 metres and horizontally of less than 16 metres. Moreover, this service requires that the probability of providing a location error vertically of greater than 10 metres be less than $10^{-7}$ under normal conditions and that the probability of providing a location error of greater than 15 metres be less than $10^{-5}$ under deteriorated conditions. The LPV200 service level imposes an alert threshold horizontally equal to 40 metres and an alert threshold vertically equal to 35 metres.

Figure 1:
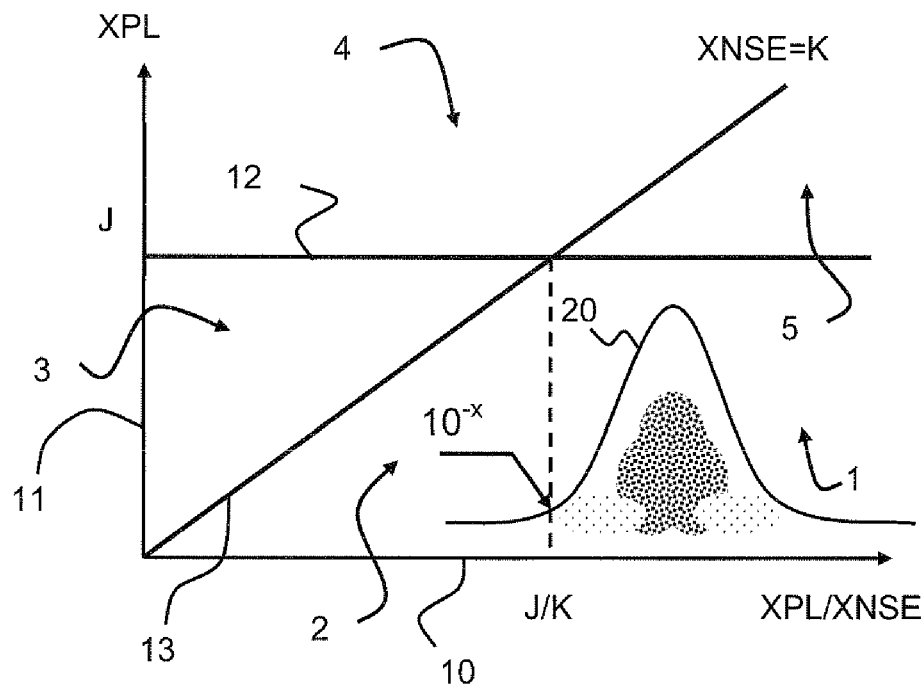
FIG. 1 represents a control chart for the precision performance of a satellite navigation system and the calculation of the probability of location error for a receiver having regard to a given level of requirement.

The invention proposes a method of calculating precision performance whatever the conditions of observation of the radiolocation signals and the probability rate requirement for observations greater than a given error. The method also makes it possible to configure any other level of requirement as regards position, as regards vertical and horizontal location. FIG. 1 graphically represents the calculations carried out for determining the performance of the navigation system.

FIG. 1 represents a chart of the location samples for a receiver of a satellite navigation system. It represents on a first axis horizontally 10 the quotient of the calculated maximum error threshold (commonly called the protection radius, a term that we will use subsequently for ease of drafting) and of the estimated location error, the quotient being displayed as a legend by the reference XPL/XNSE and being defined in a dimension of a position frame of reference. If the quotient of the protection radius and of the estimated location error had been represented in the vertical frame of reference, then the quotient would have been represented by the value VPL/VNSE and in the horizontal plane by HPL/HNSE. The protection radius XPL is obtained by calculation algorithm.

The protection radius may be obtained according to various schemes which are known to the person skilled in the art and the choice of the scheme does not constitute within the framework of the invention a limitation of the scope of the patent. For example, the protection radius may be determined on the basis of the integrity level of the satellite navigation system. The protection radius represents the possible positions in a given plane around the actual position, more exactly it is guaranteed by calculation that it will not be possible for a calculated position to be located beyond the actual position plus the protection level in a given plane.

The estimated location error XNSE is the difference between the actual position of a receiver, known precisely by various means, and the position estimated on the basis of the processing of the radiolocation signals transmitted by the satellites. For example, the position of a reception beacon of GBAS type (for "ground-based augmentation system") forming part of a satellite navigation system is known precisely. The estimated location error may be obtained according to various schemes which are known to the person skilled in the art and the choice of the scheme does not constitute within the framework of the invention a limitation of the scope of the patent.

The level of requirement of the location error K corresponds to the location error that the navigation system must not exceed for 95% of the time. Depending on the criticality of the service, the error requirement level may be 4, 10 or 15 metres. The requirement level can vary according to the dimension of the position frame of reference.

The chart represents on a second axis 11 vertically the protection radius XPL. The chart therefore represents the location data samples positioned in the chart horizontally as a function of the quotient of the protection radius XPL and of the location error XPL and vertically as a function of the protection radius. The alert threshold J is represented graphically in the chart by the straight line 12 and the level of requirement of estimated error K is represented by the straight line 13.

The method of calculating the low probability events consists in firstly calculating the proportion of samples in various categories of the chart, which are defined in the following paragraphs. It is recalled that the problematic issue of measuring precision performance depends for each user on the satellite geometry, evaluated through the DOP value. The benefit of the chart representation is to be able to view the variation in the DOP. This variation is characterized in the chart by a vertical movement of the samples. When the DOP satellite geometry value increases, the data samples shift vertically upwards in the chart. Indeed, if the DOP value increases, the protection radius increases but the quotient XPL/XNSE remains invariant since it does not depend on the DOP, in the domain of the positions the protection radius XPL being equal to the multiplication of the DOP and the integrity factor and the location error being equal to the multiplication of the DOP and of the pseudo-distance error. If the DOP decreases, the protection radius decreases and the samples shift vertically downwards.

A first category 1 calculated by the verification method comprises the samples complying with the following two conditions: the protection radius XPL is less than the alert threshold J of the service and the quotient XPL/XNSE of the protection radius and of the estimated location error is greater than the safety quotient J/K, the safety quotient being the ratio of the alert threshold J to a level of requirement of estimated error K. For these data samples, it is deduced that when the DOP varies, the samples shift vertically upwards in the case of deterioration in the geometry conditions and downwards in the case of improvement in the geometry conditions. Consequently, the samples located in this category 1 comply with the location error requirement whatever the DOP, and if the DOP deteriorates so that the location error requirement K is not complied with, then the samples necessarily exceed the alert threshold J required by the service. This therefore signifies that either the level of requirement in error is complied with and thus it is certainly complied with whatever the DOP, or the level of requirement is not complied with and thus in any case the navigation service is not usable since the alert threshold is exceeded. Therefore if, for 95% of the time, the calculated samples comply with the conditions of category 1 in an observed DOP condition then the precision performance is complied with whatever the DOP observation condition of a user. By virtue of the method it is therefore possible to determine it without having to measure all the observation conditions.

A second category 2 comprises the samples complying with the following three conditions: the protection radius is less than the alert threshold J, the quotient XPL/XNSE of the protection radius and of the estimated location error is less than the safety quotient J/K and the estimated location error XNSE is less than the level of requirement of estimated error K. For these data samples, it is deduced therefrom that the level of requirement in location error is potentially complied with. However, if the DOP value increases, the location error for certain samples may become greater than the level of requirement of the estimated error K whereas under a condition of initial DOP value the location error was lower. By calculating the samples in category 2, it is determined whether the precision performance is complied with for known observation conditions. However, it is not possible to guarantee it for all the users, notably for users who position themselves under deteriorated observation conditions relative to the sample measurement conditions.

A third category 3 comprises the samples complying with the following three conditions: the protection radius XPL is less than the alert threshold J, the quotient XPL/XNSE of the protection radius and of the estimated location error is less than the safety quotient J/K and the estimated location error is greater than the level of requirement of estimated error. For these data samples, it is deduced therefrom that the level of requirement in location error is not complied with. However, if the DOP value decreases, the location error for the samples may become less than the level of requirement of the estimated error K for certain samples whereas under a condition of initial DOP value the location error was higher. In the case of deterioration in the satellite geometry, the performance may become such that the protection radius no longer complies with the alert threshold. The navigation system must then no longer be used and the user is warned.

A fourth category 4 comprises the samples complying with the following two conditions: the protection radius XPL is greater than the alert threshold J and the estimated location error XNSE is greater than the level of requirement of estimated error K. For these data samples, the protection radius XPL is greater than the alert threshold J. If the sample proportion in this part is high then the navigation system must no longer be used since it exhibits too dangerous a location uncertainty for the user service. A poor geometry may be responsible for this performance.

A fifth category 5 comprises the samples complying with the following two conditions: the protection radius XPL is greater than the alert threshold J and the estimated location error XNSE is less than the level of requirement of estimated error K. If a large proportion of the samples is positioned in this category, then the navigation system can no longer be used since the protection radius XPL is greater than the alert threshold J whereas the location error XNSE complies with the level of requirement K.

Once the distribution of the location samples among the five categories has been obtained, a step of calculation is implemented so as to model the components of the distribution exhibiting a very low probability of occurrence and which are considered to be unobservable. This problem is solved by virtue of the implementation of the modelling by applying the theory of extreme values on the basis of the observed samples of the distribution. The principle of extreme value theory consists in modelling in the probability domain the tail of the distribution of the samples. The modelling depends on characteristic parameters of the distribution. A computer is in charge of processing the observed data so as to calculate the modelling of the distribution of the samples, the characteristics of the calculation means able to implement the modelling function on the basis of extreme value theory do not limit the scope of the invention.

FIG. 1 represents a distribution 20 of samples. The extremeties of this distribution exhibit an extremely low probability of occurrence. The requirement levels demand that systems be able to prove, for example, that the probability of a location error of greater than 10 metres is less than $10^{-7}$. For samples situated in category 1, it is known that whatever the satellite geometry and as long as the protection radius is below the alert threshold, the location error is below the requirement level K. Thus, the modelling of the tail of the distribution for the samples situated at the level of the safety quotient J/K makes it possible to calculate the probability of having samples for which the precision requirement level is certainly complied with.

In a first variant of a system for calculating the performance illustrated by FIG. 1, the probability $10^{-x}$ associated with the safety quotient J/K is calculated. This value makes it possible to calculate the probability of obtaining samples of the distribution not fulfilling the precision conditions imposed by the user service.

Figure 2:
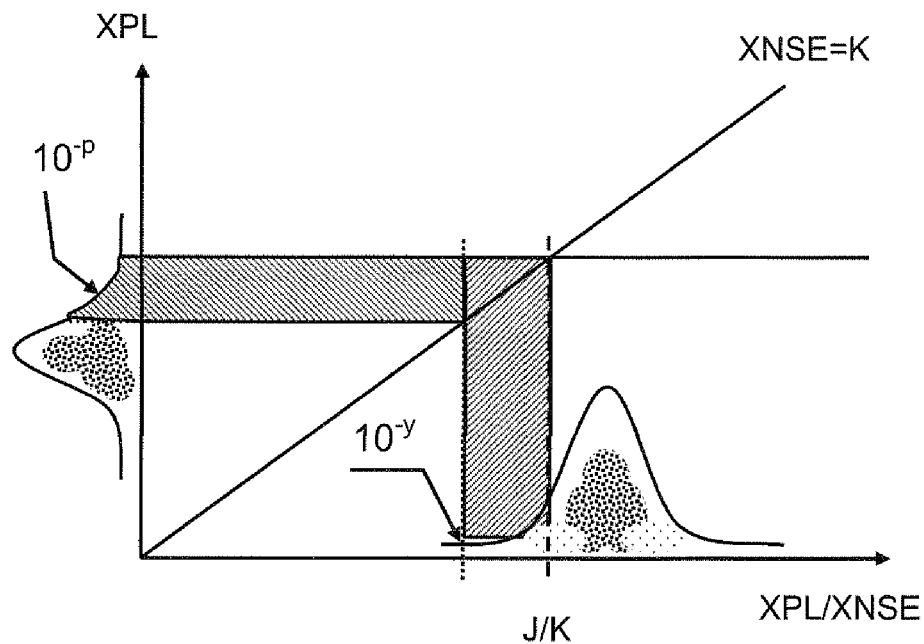
FIG. 2 represents the control chart for the precision performance and the calculation of the probability of obtaining a sample whose location error does not comply with the given level of requirement.

In a second variant of a system for calculating the performance illustrated by FIG. 2, the probability of distribution of the samples as a function of the protection radius is taken into account (under nominal or degraded conditions of observation of the samples). For this purpose, on the one hand the probability of obtaining a sample whose quotient XPL/XNSE of the protection radius and of the estimated location error is below the safety quotient J/K is calculated, this value being equal to $10^{-y}$, and on the other hand, the probability that this sample is located in category 2 of the chart is calculated, this probability being equal to $10^{-p}$. The product of these two probabilities makes it possible to determine, by virtue of the modelling of the distribution of the samples of very low probability, the probability of occurrence of a sample which does not satisfy the requirements imposed by the user service.

The invention applies to all satellite navigation systems; it is possible to cite for example the American system GPS ("Global Positioning System") or the future European system GALILEO, as well as performance augmentation systems (EGNOS for "European Geostationary Navigation Overlay Service").

The invention claimed is:

1. A method of calculating low probability events for evaluation of precision performance of a satellite navigation system comprising a space segment transmitting radiolocation signals to a receiver segment, comprising the steps:
   measuring, with a system, an estimated error of location of a receiver of the system for a plurality of samples and calculating a maximum location error threshold, being a protection radius, that can be guaranteed by the system for said samples, the estimated error and the protection radius being defined in a dimension of a position frame of reference,
   calculating, with the system, a first proportion of a distribution of samples satisfying the conditions:
   i. the protection radius being less than an alert threshold,
   ii. a quotient of the protection radius and of the estimated location error being greater than a safety quotient, the safety quotient being the ratio of the alert threshold to a level of requirement of estimated error,
   calculating, with the system, a second proportion of the distribution of samples satisfying the conditions:
   iii. the protection radius being less than the alert threshold,
   iv. the quotient of the protection radius and of the estimated location error being less than the safety quotient,
   v. the estimated location error being less than the level of requirement of estimated error,
   modelling, with the system, at least one component of the distribution of samples, the component representing the samples of low probability of occurrence of the distribution and the modelling being calculated by applying the theory of extreme values on the basis of observed samples of the distribution.

2. The method according to claim 1, further comprising a step of calculating the probability of the distribution of samples for which the quotient of the protection radius and of the estimated location error is equal to the safety quotient, to verify the precision performance.

3. The method according to claim 1, further comprising a step of calculating on the one hand the probability of obtaining a sample for which the quotient of the protection radius and of the estimated location error is below the safety quotient and on the other hand, for this sample, of the probability that the protection radius is below the alert threshold and that the estimated location error is above the level of requirement of estimated error, to verify the precision performance.

4. A system for calculating the low probability events for the evaluation of the precision performance of a satellite navigation system comprising:
   a system measuring an estimated error of location of a receiver of the system for a plurality of samples and calculating a maximum location error threshold, being a protection radius, that can be guaranteed by the system for said samples, the estimated error and the protection radius being defined in a dimension of a position frame of reference,
   the system calculating a first proportion of a distribution of samples satisfying the conditions:
   i. the protection radius being less than an alert threshold,
   ii. a quotient of the protection radius and of the estimated location error being greater than a safety quotient, the safety quotient being the ratio of the alert threshold to a level of requirement of estimated error,
   the system calculating a second proportion of the distribution of samples satisfying the conditions:
   iii. the protection radius being less than the alert threshold,
   iv. the quotient of the protection radius and of the estimated location error being less than the safety quotient,
   v. the estimated location error being less than the level of requirement of estimated error,
   the system modelling at least one component of the distribution of samples, the component representing the samples of low probability of occurrence of the distribution and the modelling being calculated by applying the theory of extreme values on the basis of observed samples of the distribution.

* * * * *